United States Patent [19]

Nute, Jr.

[11] 4,068,438
[45] Jan. 17, 1978

[54] CEILING RUNNER
[75] Inventor: Ernest B. Nute, Jr., Mountville, Pa.
[73] Assignee: Armstrong Cork Company, Lancaster, Pa.
[21] Appl. No.: 780,418
[22] Filed: Mar. 23, 1977
[51] Int. Cl.² ............................. E04B 5/52; E04C 3/32
[52] U.S. Cl. ............................................ 52/488; 52/492; 52/495; 52/664; 403/230; 403/245; 403/263
[58] Field of Search ................ 52/492, 494, 495, 497, 52/493, 488, 664, 669, 732, 484; 403/230, 245, 263

[56] References Cited

U.S. PATENT DOCUMENTS

| | | | |
|---|---|---|---|
| 1,074,895 | 10/1913 | Rapp | 52/461 |
| 3,016,997 | 1/1962 | Price | 52/668 |
| 3,067,323 | 12/1962 | Kember | 52/484 |
| 3,633,952 | 7/1970 | Nikolaus | 403/230 |
| 3,798,865 | 3/1974 | Curtis | 52/665 |
| 3,835,614 | 9/1974 | Downing | 52/666 |

FOREIGN PATENT DOCUMENTS

| | | | |
|---|---|---|---|
| 736,145 | 6/1966 | Canada | 52/495 |
| 65,636 | 10/1955 | France | 52/495 |
| 403,258 | 7/1966 | Switzerland | 52/498 |

*Primary Examiner*—Price C. Faw, Jr.
*Assistant Examiner*—James Lee Ridgill, Jr.

[57] ABSTRACT

The invention is directed to a ceiling runner which has a generally U-shaped configuration. The runner has flanges to support ceiling boards. The side walls of the runner are formed with grooves which may be used to support the runner in position or define an isolated chamber within the body of the runner. The side walls of the runner have a second groove which is used for positioning ceiling boards on the flanges.

2 Claims, 4 Drawing Figures

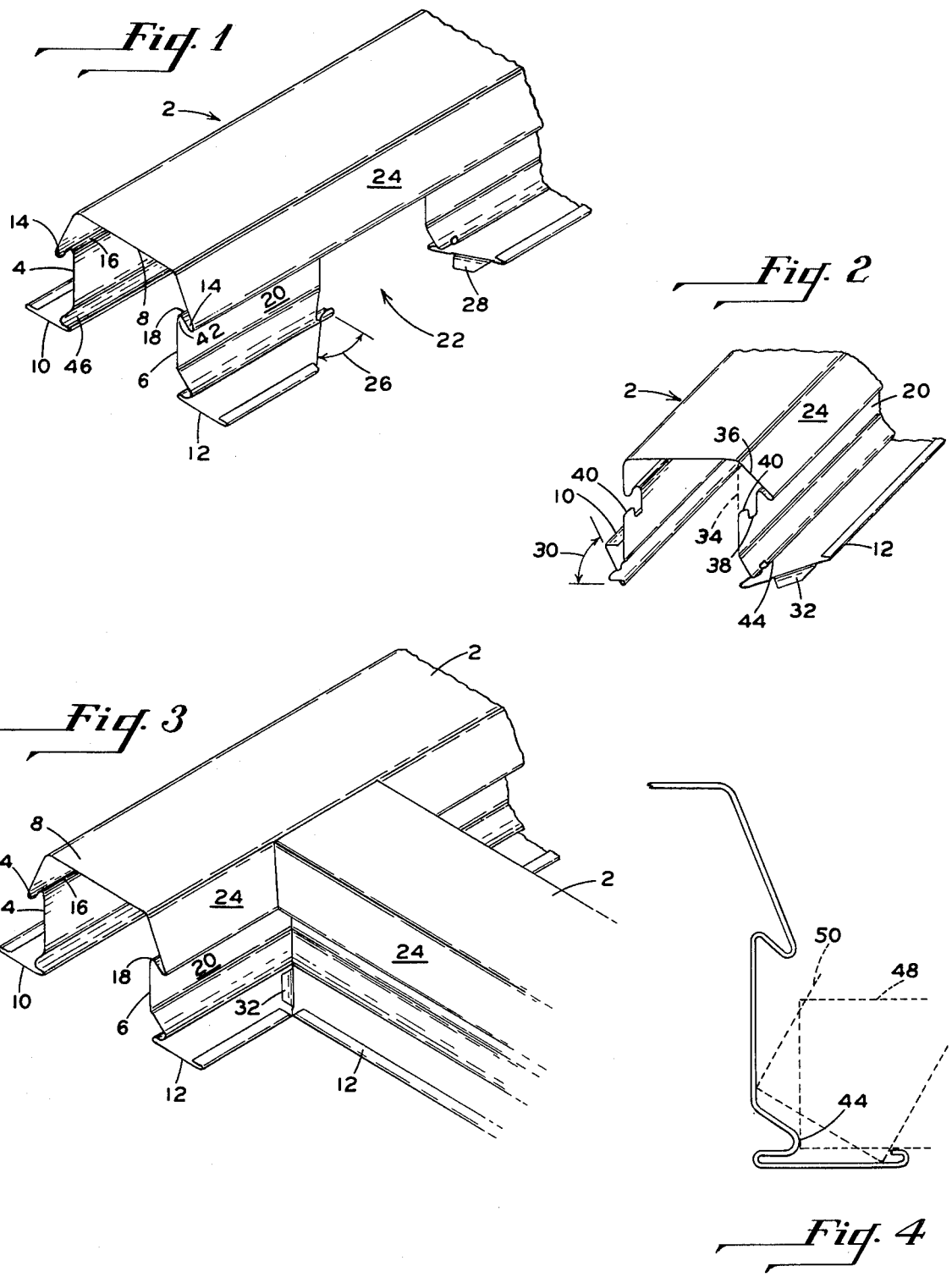

//  4,068,438

CEILING RUNNER

CROSS-REFERENCE TO RELATED APPLICATION

This application is an improvement over the ceiling runner set forth in U.S. application Ser. No. 780,417, filed Mar. 23, 1977, in the name of J. C. Ollinger, and entitled "SUSPENDED CEILING RUNNER".

BACKGROUND OF THE INVENTION

1. Field of the Invention

The invention is directed to a suspended ceiling system and, more particularly, to a runner member of a specific configuration for use in the suspended ceiling system.

2. Description of the Prior Art

U.S. Pat. No. 2,447,694 is directed to a runner structure having a configuration somewhat similar to that of the claimed invention. The runner structure therein is not an exposed grid member in that it cannot be viewed from below a suspended ceiling system, and it functions, primarily as a fastening means for another runner in a concealed grid system suspended ceiling.

U.S. Pat. No. 3,067,323 is directed to another runner structure which has cross-sectional configurations somewhat like the claimed invention. Again, the patented structure differs from the claimed invention primarily in the fact that the patented structure is not formed to be mounted as per the claimed invention and that the patented structure does not have flanges for supporting a ceiling system.

Finally, U.S. Pat. No. 3,708,932 is directed to a grid member having a structure slightly similar to the claimed invention. The primary difference between the patented structure and the claimed invention is the positioning of the groove structure in the side walls of the runner member.

The claimed invention is a specifically designed runner structure which is meant to carry out specific functions, as will be set forth below.

SUMMARY OF THE INVENTION

The invention herein is a ceiling runner which is to be used in a ceiling suspension system. The runner is of a generally elongated inverted U-shaped configuration. The runner has two partly inclined side walls which are connected together by a flat top member. The runner has horizontal flanges which are used to support ceiling boards. The side walls of the runner have a first groove means therein, and said groove means extend outwardly from the side wall to form two parallel ledges inside of the U-shaped body configuration of the runner. The grooves are positioned about midway of the side walls of the runner. A second groove means is provided in the side walls closely adjacent the horizontal flanges.

BRIEF DESCRIPTION OF THE DRAWING

FIG. 1 is a perspective view of the runner structure having its side arranged to receive the end of another runner structure;

FIG. 2 is a perspective view of an end configuration of a runner structure which is meant to be fastened to the side of the runner structure of FIG. 1;

FIG. 3 is a view of two runner structures being fastened together with the end of one runner structure engaging the side of another runner structure; and FIG. 4 is an end view of a runner structure and a ceiling board.

DESCRIPTION OF THE PREFERRED EMBODIMENT

The sheet metal, elongated runner structure 2 herein has generally the cross-sectional configuration shown in FIG. 1. The cross-sectional configuration is generally an inverted "U" shape with side walls 4 and 6. The side walls 4 and 6 are connected together by a flat top member 8. Horizontal flanges 10 and 12 extend outwardly from the runner member 2 at the lower ends of the side walls 4 and 6. It is on these flanges 10 and 12 that ceiling boards will be supported. The runner members 2 are arranged in a grid pattern so as to support ceiling boards on the flanges 10 and 12 within the grid pattern.

Each of the side walls has a groove 14 therein at the mid region thereof. The grooves extend outwardly from the side walls to form two parallel ledges 16 and 18 on the inside of the U-shaped body configuration. The grooves 14 extend below and outwardly of these parallel ledges 16 and 18. The grooves, in effect, form an overhang over a portion 20 of the side walls.

The side walls have a cutout 22 therein which is used to receive the end of a runner member 2. The cutout actually exists in the lower portion 20 of the side wall and the flange 12. The upper portion of the side wall 6, which overlies the groove 18 and actually forms the groove 18, is not cut out. A section of the lower portion 20 of the side wall is removed, and the width of the cutout area is equal to the distance between two side walls 4 and 6 measured from opposite portions 20 of each of the side walls. The flange 12 also has a cutout with the flange cut back at a 45° angle, as shown by element 26 of the drawing. On one side of the cutout flange 12 there is provided a tab 28 which extends slightly beyond the end of the flange.

FIG. 1 is a showing of a runner member 2 with the side cut out, but the end configuration in no way altered to engage the cutout 22. Fig. 2 is a view of the end of a runner 2 which has been altered to engage the cutout 22. The flanges 10 and 12 have been cut back at an angle 45°, as shown by element 30. One of the flanges is provided with a tab 32. The lower portion 20 of the side walls 4 and 6 are not cut. However, the upper portion 24 of the side walls 4 and 6 are cut back at an angle from the original edge 34 of the runner 2. The dotted line indicated as element 34 shows the original edge of the runner. An angle of approximately 22° is cut into the upper portion 24 of the side walls so that the edges 36 of the runner 2 will now engage the inclined surface of portion 24 above the cutout 22. In effect, the end of the runner has been configured so that it conforms to the contour of one side wall. In cutting out a portion of the upper portion 24 of the side walls 4 and 6, a notch 38 is provided in the lower portion 20 of the side walls. This notch provides a protrusion or hook element 40 in each side wall which slides under the overhanging groove of the side wall. The protrusion slides up into engagement in recess 42 (FIG. 1) and helps lock the end of the runner member to the side wall of an adjacent runner member. One tab 32 overlies one flange member, and tab 28 goes under another flange member so as to further assist in holding the runner members 2 in position. The positioning of the two tabs 28 and 32 prevent relative movement of the flanges 10 and 12 of one runner member adjacent the cutout flange 12 of another member, and thus permits the protrusions 40 to maintain their engagement with recess 42. This locks together the two runner members to help establish the grid system of a suspended ceiling system.

The improvement herein over the above-identified application on a "SUSPENDED CEILING RUNNER" resides in the provision of the stop 44 just above the flanges 10 and 12. The lower portion 20 of the side walls 4 and 6 are provided with a second groove 46 which faces inwardly of the U-shaped configuration of the runner and forms the stop 44 which extends outwardly from the lower portion 20 of the side walls. FIG. 4 is a detailed view of the stop 44 and its use relative a ceiling board resting upon the flange 12. Normally, a ceiling board will have about ½ inch of the edge of the ceiling board resting upon the flange. That means that the flange should normally be approximately ½ inch in width from the side wall portion 20 to the end of the flange. This will work fine for a ceiling board which is resting on the flange 12 and is positioned parallel to the flange 12, as shown by the ceiling board 48 in a dotted line configuration in FIG. 4. However, it sometimes becomes desirable to position a ceiling board to form what is called a vaulted module. This means that the board is inclined from the plane containing the flange 12 and extends upwardly at an angle from the flange 12. This is best shown as the dotted line configuration 50 which shows the relative position of a ceiling board when it is inclined to form a vaulted module. Normally, a ceiling board is thicker than ½ inch, and if the ceiling board is inclined, the amount of inclination that you can get for the ceiling board is governed by the width of the flange and the thickness of the ceiling board. A half-inch wide flange with a very thick ceiling board could only permit the ceiling board to incline slightly relative the plane of the flange. At some point as the board is raised from its parallel position to the flange, the upper corner of the ceiling board engages the wall 20 and pushes the lower corner of the ceiling board outwardly along the flange. At some point, the lower corner of the ceiling board would slide off the half-inch wide flange. Consequently, it has been found that with a conventional vaulted ceiling system, the horizontal flange should be approximately ¾ inch in width. When one makes the flange ¾ inch in width, but has the grid system positioned and the ceiling boards cut for placement of the ceiling boards parallel with the flange, there is close to ¼ inch free play on each flange, or close to ½ inch overall free play between two parallel runners. Consequently, it is possible that the ceiling board could be put in position close against the side wall 20 of one flange, leaving an unsightly gap between the opposite edge of the ceiling board and the edge of the flange of the adjacent ceiling runner. Therefore, the ceiling board should always be positioned so that both edges of the ceiling board are resting upon the flanges of adjacent runners. The stop 44 engages the ends of ceiling boards, forms a flange of an effective ½ inch width and ensures the positioning of the ceiling board so that both ends of the ceiling board rest upon flanges of adjacent runners and do not provide a gap between the edge of the ceiling board and the edge of the horizontal flange. However, the stop 44 is positioned close enough to the horizontal flange so that when a ceiling board is inclined for a vaulted ceiling configuration, the stop 44 does not obstruct the positioning of the ceiling board. This can clearly be seen by looking at the dotted line showing of two ceiling boards in FIG. 4 wherein a ceiling board 46 is shown in its position parallel to the flange being held in position by the stop 44, and also in position inclined to the flange 12 wherein the stop 44 does not interfere with the positioning of the inclined board 48.

The runner members are normally painted black and are made from sheet metal. They are bent into the required configuration and suspended from the structural ceiling of a room. Either conventional wire suspension means or special suspension structures may be used to suspend the ceiling runner 2 at a spaced distance from the structural ceiling of a room. A number of runner members are engaged together, with the ends of some of the runner members engaging sides of other runner members to form a grid pattern arrangement of the runner members. Into this grid pattern arrangement, as indicated above, conventional fibrous ceiling boards are positioned. All parts of the conventional ceiling system are well known in the art, with the inventive concept herein being the cross-sectional configuration of the runner member.

An additional advantage of the groove 46 is that prior to the bending of sheet metal into the above-described "U" shape, pre-painting can readily be carried out. The finished product has the flanges painted white and the inside of the runner, between the side walls, is painted black. The line between the white area and black area is within the groove 46. Because of the size of the groove 46 and the fact that the inside of the groove is not readily visible from the open side of the "U" shape, the tolerance for the line between the white area and black area can be rather wide.

What is claimed is:

1. In a ceiling runner having an elongated sheet metal body with a generally inverted U-shaped configuration, said runner having two side walls connected together at their one ends with a flat top member, the opposite sides of the side walls having horizontal flanges which extend outwardly from the body of the runner to support ceiling boards on either side of the runner, said side walls having a first groove means therein, said first groove means being in the mid region of the side walls and extending outwardly from the side walls to form two parallel ledges inside the U-shaped body configuration, said grooves extending below and outwardly of the parallel ledges, and a second groove means in the side walls closely positioned to the horizontal flanges forming a stop means extending outwardly from the side walls of the runner adjacent said horizontal flanges.

2. In a ceiling suspension system comprising at least two runners, each runner having an elongated sheet metal body member and a generally inverted U-shaped configuration, said runner having two side walls connected together at their one ends with a flat top member, the opposite ends of the side walls having horizontal flanges which extend outwardly from the body of the runner to support ceiling boards on either side of the runner, said side walls having a first groove means therein, said first groove means extending outwardly from the side walls to form two parallel ledges inside the U-shaped body configuration, said first groove means extending below and outwardly of the parallel ledges and being in the mid region of the side walls, the end of one runner abutting the side of a second runner, said second runner having its side and adjacent flange partially cut away, said end of the other runner having a portion of the end cut away to form two hook elements on said side walls, said hook elements engage the side wall of the second runner just above the cutout area, the improvement comprising a second groove means positioned in the side walls closely adjacent the horizontal flanges, said second groove means forming a stop means which projects outwardly from the side wall, said ceiling suspension system supporting fibrous ceiling boards on said horizontal flanges, said stop means locating ceiling boards on the horizontal flange, which ceiling boards extend parallel with said horizontal flange, said stop means not interfering with the positioning of ceiling boards which are positioned on said horizontal flanges at an upward extending angle relative to the plane of the horizontal flange.

* * * * *